(12) United States Patent
Allouche

(10) Patent No.: US 6,934,407 B2
(45) Date of Patent: Aug. 23, 2005

(54) METHOD AND SYSTEM FOR TAG DETECTION AND TRACKING IN MRI TAGGED IMAGES

(75) Inventor: Cyril Allouche, Paris (FR)

(73) Assignee: Koninklijke Philips Electronics, N.V., Eindhoven (NL)

(*) Notice: Subject to any disclaimer, the term of this patent is extended or adjusted under 35 U.S.C. 154(b) by 715 days.

(21) Appl. No.: 10/022,398

(22) Filed: Oct. 30, 2001

(65) Prior Publication Data

US 2002/0122577 A1 Sep. 5, 2002

(30) Foreign Application Priority Data

Oct. 31, 2000 (EP) .......................................... 00403028

(51) Int. Cl.$^7$ ................................................ G06K 9/00
(52) U.S. Cl. ...................... 382/128; 382/131; 382/132
(58) Field of Search .......................... 382/128, 131–132

(56) References Cited

U.S. PATENT DOCUMENTS 5,275,163 A * 1/1994 McKinnon et al. ......... 600/413
5,923,770 A * 7/1999 O'Donnell et al. ......... 382/131
6,295,464 B1 * 9/2001 Metaxas ..................... 600/407

OTHER PUBLICATIONS

Prince et al., "Motion Estimation from Tagged MR Inage Sequences," IEEE, Jun. 1992, pp. 238–249.*
Kraitchman et al., "Semi–Automatic Tracking of Myocardial Motion in MR Tagged Images," IEEE, Sep. 1995, pp. 422–433.*
Funka–Lea, et al., "The use of hybrid models to recover cardiac wall motion in tagged MR images," IEEE, 1996, pp. 625–630.*
Kumar, et al., "Automatic tracking of SPAMM grid and the estimation of deformation parameters from cardiac MR images," 1994, IEEE, pp. 122–132.*

* cited by examiner

*Primary Examiner*—Bhavesh M. Mehta
*Assistant Examiner*—Shefali Patel

(57) ABSTRACT

An image processing method of accurately fully automatically detecting Tag Points (16) of a tagged image (10) of a sequence of MRI tagged images (for example, SPAMM protocol) comprises the steps of estimating (13) optimum value points of the intensity profile; labeling said points as Candidate Points (14) of a tag; automatically constructing (18) a Predicted Image (17) from determined Tags equations (19) of at least a preceding image of the sequence and from spatial and temporal parameters; detecting (15) Tag Points (16) among Candidate Points (14), using characteristics of the constructed Predicted Image (17); determining (20) Tag equations (21) from detected Tag Points (16), said Tag equations (21) intended to be used in the construction (18) of at least another Predicted Image for a next image of the sequence. The method further allows assigning a Tag Point to a specific Tag whatever the temporal resolution, this feature allowing the tracking of Tags from one image to the next of the sequence.

10 Claims, 3 Drawing Sheets

METHOD AND SYSTEM FOR TAG DETECTION AND TRACKING IN MRI TAGGED IMAGES

FIELD OF THE INVENTION

The invention relates to an image processing method of detecting "tag" points in a "tagged" image of a sequence of images, said "tags" being the pattern observed on the "tagged" image resulting from the spatial modulation of the magnetization in the observed zone. The invention relates to any kind of modulation patterns that can be parameterized in the frequency domain. Tags can be, for example, straight lines in one modulation direction (SPAMM protocol), straight lines in several directions generating all kinds of grids (SPAMM protocol) or generating radial patterns and circles of different diameters. In the following a tag would designate any kind of constituent part of a larger pattern that can be defined in the frequency domain. Generally it would be a straight or a curved line at the beginning of a sequence, which line is then deformed by the movement of the zone wherein the magnetization is modulated. Following the tag and its deformation is an issue of the invention.

The invention also relates to a computer program product wherein the method is implemented, to an image processing system and to an MRI apparatus to carry out the method.

The invention finds its application in Magnetic Resonance Imaging (MRI).

BACKGROUND OF THE INVENTION

A semi-automatic image processing method for detecting tag points is already known from a publication by M. Guttman et al. entitled "Tags and Contour Detection in Tagged MR Images of the Left Ventricle" published in IEEE Trans. Med. Imaging, 13:74–88, 1994. This article specifically relates to tag lines. As described in this publication, the user initializes tag line points and these points are followed by an algorithm based on a dynamic programming, which is guided by the user from one image to the next by using an intensity profile. The attribution of a point to a tag line is always checked by the user, because a point could easily be affected to two neighboring tag lines. This method does not use any modeling of tag lines nor any predicted movements of tag lines. According to this known method, the image processing is slow and is consequently difficult to implement in view of diagnosis clinical applications. Moreover, since the algorithm is not fully autonomous for tracking the tag lines, this known method requires many user interactions for yielding a valid tracking of a tag line from one image to the next. Besides, the accuracy of the detection of tag points is not validated by any analysis or reconstruction of movement.

SUMMARY OF THE INVENTION

It is an object of the present invention to provide an image processing method of accurately fully automatically detecting tag points in an MRI image that is tagged according to a modulation pattern as described in the introduction.

It is to be noted that in an image of a sequence of images, each tag shows a motion from a current image to the next one. A current image is defined as the image of the sequence at time (t) wherein tag points are under detection, time t being incremented from the start to the end of the sequence. According to the invention, said motions of tags are taken into account. The motions of tags are predicted by spatial and temporal continuity to yield a predicted image, which predicted image is further used to detect tag points in a next image.

It is an object of the invention to yield such a predicted image with sufficient information to allow an accurate detection of tag points.

In accordance with the invention, an image processing method of detecting tag points in a current tagged image of a sequence of tagged images, comprises steps of:

in the current image, estimating points which have optimal intensity values in intensity profiles and labeling said points as candidate points of a tag; using a previously constructed predicted image constituted by predicted tags determined from tag equations of a preceding image of the sequence and from spatial and temporal parameters; and, in the current image, detecting tag points among said candidate points from said previously constructed predicted image; determining tag equations for the current image from said detected tag points; using said tag equations in the construction of a further predicted image for processing a next image of the sequence.

The determination of an equation for each tag of each image of the sequence, that is a modeling of tags, allows to work with whole tags, for example, whole lines, instead of points to estimate motions from one image to another. As, according to the invention, whole tags instead of only points on a more or less interrupted straight or curved line are available, and as an equation of each tag is known, it is possible to construct, by spatial and temporal continuity, a predicted image constituted by predicted tags, for a next image, which predicted image is rich in information since whole tag positions are predicted. Moreover, knowing the likely positions of each tag as a whole allows to determine that a candidate point belongs to a specific identified tag: consequently an automatic tracking of tags is performed from one image to another, from the beginning of the sequence where the identification of specific tags is easy to the end where motions of tags render the identification harder. Another advantage of the algorithms working on whole tags, according to the invention, is their rapidity.

In an embodiment, the method of the invention comprises steps of computing equations of tags by using a Rational Fitting from the detected points. Said Rational Fitting can be used alone or in combination with a further fitting using a Residue Technique. The obtained detection is very accurate as this particular mathematical expression of tags allows a very good fitting to real tags, especially when tags are straight lines at the beginning of the sequence, and, consequently, allows to construct trustful predicted tags for following images.

In an embodiment, the method of the invention comprises steps to evaluate the belonging of a candidate point to a specific identified tag even when a low temporal resolution is used. In effect, the longer the time between two images of the sequence, the larger the motion of tags is from one image to the next. Consequently, even when modeling of tags according to the invention is used, there is a chance of selecting a point as belonging to a given tag although, in reality, this point belongs to another appropriate tag.

In an embodiment, the invention takes into account that the intensity profile of an MR image presents minimum magnetization which is conventionally considered to constitute the tags, and maximum magnetization, less detectable than said minimum magnetization, which is generally very sharp, and constitutes another family of tags, labeled positive tags. Two tags conventionally corresponding to a minimum of magnetization are always separated by a positive tag. Optimum points estimated by the image processing method of the invention include the points corresponding both to maximum and minimum values. The points corresponding to maximum values are especially well localized when working on CSPAMM protocol images, as these images present a good contrast. The method of the invention comprises steps to use the alternating pattern of these two kinds of tags and their spatial characteristics in order to detect tag points and in order to determine with great accuracy to which specific tag a point belongs.

In an embodiment of the invention, the detection step using characteristics of the predicted image comprises sub-steps of:

distinguishing two kinds of tags: negative tags corresponding to minimum magnetization and to maximum intensity in the intensity profile, and positive tags corresponding to maximum magnetization and to minimum intensity in the intensity profile;

distinguishing two kinds of candidate points: candidate points being optimal value points corresponding to maximum intensity in the intensity profile, and candidate points being optimal value points corresponding to minimum intensity;

selecting points of a negative tag D as being the candidate points corresponding to the maximum intensity, which are situated between the two predicted positive tags that surround the predicted negative tag that corresponds to the negative tag D, and symmetrically selecting the points of a positive tag.

The delimitation of the region where tag points can be detected requires the use of whole predicted tags, which is the main feature of the invention. This delimitation affords the advantage of critically reducing the chance of selecting a point that belongs to a given tag of one kind to another tag of the same kind, which was common when only negative tags were conventionally used. Moreover, the use of maximum value tags offers the advantage of providing more points than conventional techniques using only tags corresponding to a minimum value of magnetization. Characteristics of the predicted image are consequently more abundant, allowing a more accurate detection of tag points and a better tracking of the tags, especially in case of low temporal resolution.

In an embodiment, the method comprises a step of automatically constructing a predicted image including sub-steps of choosing a given number of privileged points on tags of the preceding image of the sequence; calculating from positions of said privileged points in the preceding image of the sequence, a predicted position of said privileged points; constructing predicted tags of the predicted image from predicted positions of said privileged points. This last step can comprise sub-steps of estimating a minimizing function (f) that minimizes the distance between the predicted positions of privileged points and the result of the application of this minimizing function (f) to these privileged points; applying the minimizing function (f) to tag equations of the preceding image of the sequence to construct the tags of the predicted image. Said minimizing function (f) can be a function of similarity expressed as $f(z)=lz+c$, where l and c are complex parameters.

In an advantageous embodiment of the invention, privileged points are intersections between tag lines obtained from an MR image tagged on two different directions or between tag lines obtained from two MR images each tagged in one direction different from the tagging direction of the other, said two MR images corresponding to a similar step of the sequence. The intersections are calculated from the two tag line equations. The use of this feature presents a particular advantage since these intersections are easily identifiable on every image of the sequence and, consequently, can be easily tracked from one image to another.

By acting on whole tags instead of acting on points, the method of the invention allows fast image processing, since an algorithm acting on whole tags knowing an equation for each of them takes up few resources. Taking up resources can be further reduced by using an image segmentation, for separating regions of interest from other regions where tag lines exist, but do not provide interesting information.

The invention first allows a very reliable detection of tag points and consequently allows a good tracking of tags from one image of a sequence to a next image of the sequence.

BRIEF DESCRIPTION OF THE DRAWINGS

The invention is described hereafter in detail, with reference to the schematic drawings wherein.

DETAILED DESCRIPTION OF THE EMBODIMENTS

Figure 1:
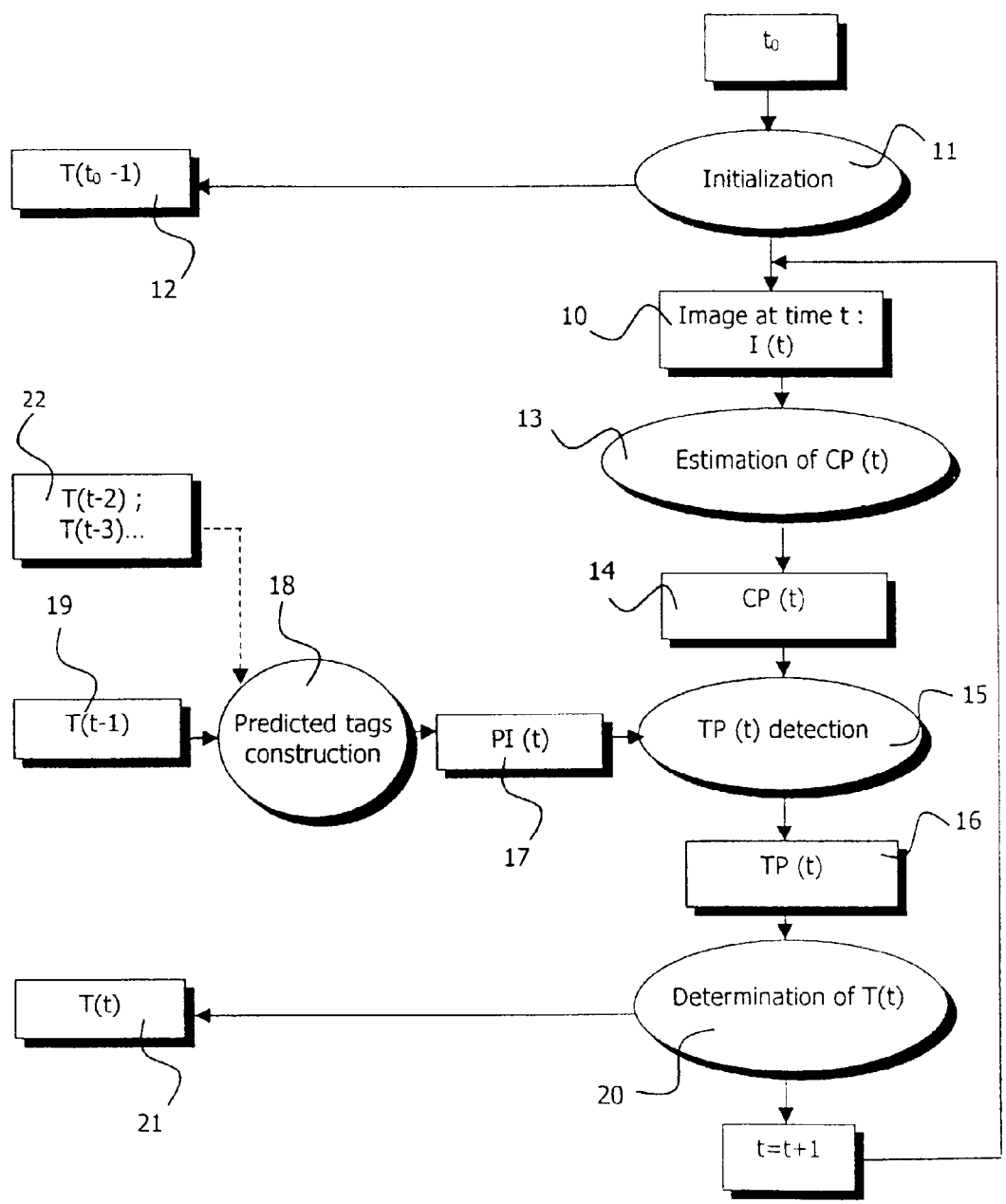
FIG. 1 is a flow chart for illustrating a method of detecting tags.

FIG. 1 is a flow chart which illustrates an image processing method according to the invention. In this diagram, processing steps are illustrated by oval blocks and the results of the processing steps are illustrated by rectangular blocks.

Referring to FIG. 1, the image processing method has iterative steps applied to a sequence of tagged images for tracking tags on successive images of a sequence of MRI tagged images. According to this method, tag points are detected by using a predicted image constructed from, at least, the preceding image. Then, the detected tag points are assigned to a specific tag, said specific tag being consequently "tracked" from one image to the next image.

An initialization step 11 is required as, for the first image of the sequence, at a first instant called time $t_0$, there is not any preceding image available to construct a predicted image. The first image of a sequence of tagged images is a non-deformed image presenting, for example, straight and parallel tags. These straight and parallel tags correspond to the case of unidirectional line modulation or grid pattern modulation, which are preferred features for the invention. Consequently, the initialization step 11 constructs a first set of equations of tags $T(t_0-1)$ (12) at a previous instant called time $(t_0-1)$ describing, for example, straight and parallel lines. This first set of equations is then used for constructing a predicted image used for the detection of tag points of an image at time $t_0$. The method according to the invention is then effectively implemented on a current image 10 at a current instant called time t of the sequence from $t_0$ to $t_{end \ of \ sequence}$, which current image is denoted by image I(t). An estimation step 13 applied to said current image I(t) 10 estimates optimal points denoted CP(t) 14 and labeled Candidate Points.

Then, a detection step 15 performs a detection of tag points denoted TP(t) 16. This detection step 15 detects the tag points TP(t) 16 of the tags among the candidate points CP(t), using characteristics of a predicted image PI(t) 17 automatically determined by a construction step 18 of the predicted image PI(t)

In the construction step 18, the predicted image PI(t) is formed by predicted tags, which are computed from tags equations 19 of at least a previous image of the sequence with respect to the time t of the current image and from spatial and temporal parameters, said tag equations being denoted T(t−1). This construction step 18 uses temporal parameters by using at least tags T(t−1) provided at an instant (t−1) 19, but can also use tags T(t−2) of an instant (t−2) and tags T(t−3) of an instant (t−3) 22 and so on as soon as these data are available from the processing of images of the sequence.

According to an advantageous embodiment of the invention, a spatial condition using the intensity gradient of the predicted image PI(t) 17 as a spatial parameter allows to discard the greater part of contour points and noise. At each point of the predicted image PI(t) 17, an orientation angle, denoted β(x,y), is given to the predicted tags by the normal vector. Simple interpolation techniques, such as bilinear interpolation, enable to compute this angle β(x,y) for every point in the predicted image. A maximum error coefficient α (the same for every point) is attributed for β(x,y) in the whole image, said coefficient depending of the noise level of the real-world images. Candidate points which are selected using this spatial condition are the ones where the gradient direction lies in β(x,y)+/−α. This spatial condition application is used to discard the greater part of contour points and noise. Another spatial condition using the distance of a candidate point from predicted tags as a spatial parameter can be used, said distance being included in a given range or being a function of positions of the predicted tags.

Figure 2:
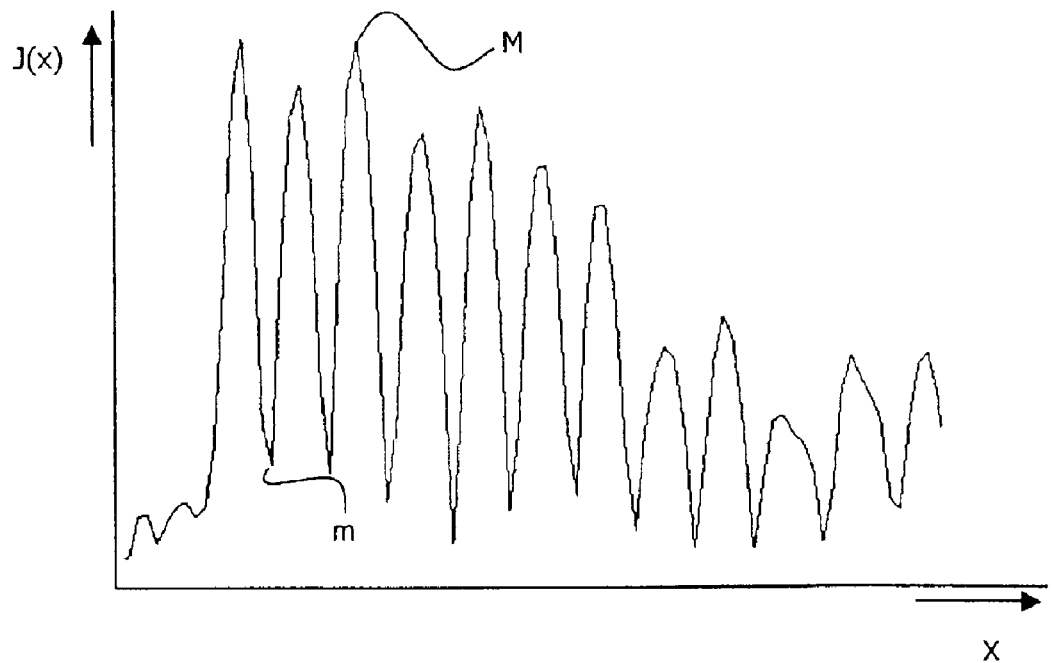
FIG. 2 is an intensity profile of an MR image in the modulation direction in the case of a unidirectional modulation of magnetization.

In an example, spatial conditions on distance use the fact that, referring to FIG. 2, the intensity J(x) profile in the modulation direction of an MR image tagged in one modulation direction x presents minimum value points m of magnetization, which are conventionally considered to constitute the tags, here denoted negative tags, and maximum value points M, less stable than minimum value points m, which are generally very sharp. These maximum value points M constitute another family of tags, labeled positive tags. Minimum value and maximum value points are characterized and, further localized, by cancellation of the derivative function. Using conventional image processing, maximum value points M can be distinguished from minimum value points m. Although maximum value lines are less detectable than minimum value lines, the use of maximum value points allows to work on a narrower grid of tags than when only minimum value points are used as is conventionally done.

Figure 3:
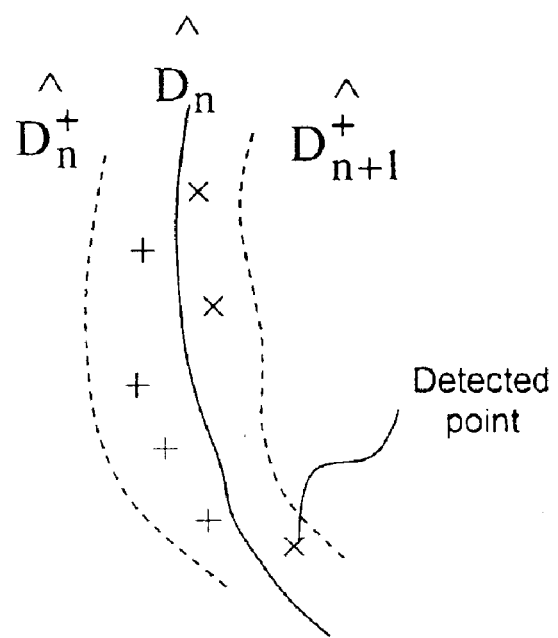
FIG. 3 is an example of a spatial condition used for selecting tag points.

In an embodiment of the invention, an advantageous spatial condition on the distance of a candidate point from predicted tags of the predicted image can be used for using the predicted positive and negative tags and their alternating patterns, since two tags are always separated by a positive tag, and vice versa. For example, as illustrated in FIG. 3, the candidate points corresponding to minimum intensity values and represented by a x and lying between predicted tags $\hat{D}_n^+$ and $\hat{D}_n^+$, and near enough to predicted tag $\hat{D}_{n+1}$ are assigned to tag $D_n$. Predicted entities are represented with a ^. This enables to assign the detected tag points to specific tags without ambiguity, whatever the tag pattern used. This feature is especially interesting when the sequence is acquired with a low temporal resolution.

Tag points 16, obtained after the tag point detection step 15, are used in a determination step 20 to determine the tags T(t) 21 of I(t) (FIG. 1).

A technique of determination of the tag equations is proposed hereafter: In a preferred embodiment, a Numerical Rational Approximation Algorithm is applied to calculate an equation of tags from selected tag points. This approximation is a first "rigid" representation of tags in the space of rational functions of a degree lower than 4 and denoted $FR_{4,4}$. These functions are able to interpolate smoothly in informationless zones (typically inside the myocardium), far better than polynom-based interpolators. Given a set of p points $\{(X_i,y_i), i=1 \ldots p\}$ labeled to a same tag, the best rational least squares approximation on function y=f(x) can be computed to find:

$$Inf_{f \in FR_{n,n}} \left( \sum_{i=1}^{p} ((f(x_i) - y_i)^2) \right) \text{ with } f:x \to \frac{\sum_{k=0}^{n} a_k x^k}{\sum_{k=0}^{n} b_k x^k}.$$

Consequently, the following iterative problem is introduced:

$$(\hat{P}_n, \hat{Q}_n) \leftarrow Inf_{P,Q} \left( \sum_j \left( \frac{P(x_j) - Q(x_j) y_j}{\hat{Q}_{n-1}(x_j)} \right)^2 + k_1 \int_{x_m}^{x_M} \left( \frac{P(x) - Q(x)\hat{f}_{n-1}(x)}{\hat{Q}_{n-1}(x)} \right)^2 dx + k_2 \int_{x_m}^{x_M} \left( 1 - \frac{Q}{\hat{Q}_{n-1}} \right)^2 \right)$$

e discrete approximation of the two integrals by Riemann sums leads to a linear system in $\{a_i, b_i\}$. The convergence is rapidly observed in practice.

In an advantageous embodiment, a second level of approximation is added, to locally compensate for the error. Named "elastic" representation, this approximation uses $I_\delta$, that is a partition $\{[x_i, x_{i+1}], i=1 \ldots n\}$ of step δ along the x-axis. On $[x_i, x_{i+1}]$, the residue $R_i$ is expressed by the median of the error between a sample and the rational function. Then, the error is:

$$E(x) = \left( \sum_i R_i \chi[x_i, x_{i+1}] \right) * e^{-(x/\sigma)^2}.$$

That is to say, the convolution of the step-function $(R_i)_i$ by the centered gaussian of standard deviation σ. E(x) simplifies in:

$$E(x) = R_1 \text{erf}(x/\sigma) - R_n \text{erf}((x - x_n)/\sigma) + \sum_{i=1}^{n-1} \frac{1}{2}(R_{i+1} - R_i)\text{erf}((x - x_i)/\sigma).$$

Hence, the description space for tag equations is formally:

$$FR_{\varepsilon_\sigma, I_\delta} = FR_{4,4} + \text{Vect}\left\{ \text{erf}\left(\frac{x - x_k}{\sigma}\right), k \right\} \subset C^\infty$$

Equations found by this approximation allows to very closely approach real tags. A reliable construction of the predicted image can then be realized.

A predicted image construction is further proposed hereafter: Tags T(t−1) are used in a predicted image construction step 18 (FIG. 1), which uses the tag equations from at least the preceding image, for the construction of a predicted image then used to process I(t) from a given sequence.

In an embodiment of the invention, privileged points are chosen among points on the tags of at least a preceding image. A predicted position of each of said privileged points for the time of the next-in-time image of the sequence is evaluated from positions of said privileged points on, at least, the preceding image.

In an advantageous embodiment, tags are lines and equations of tags are known in two different directions, from an MRI image tagged in two different directions or from two MRI images, corresponding to similar times of the sequence. Each of the two MRI images is tagged in one direction different from the tagging direction of the other, and privileged point positions are calculated as being intersections between tag lines in the two different directions. It is important to note that intersections are advantageously used, because they are easily identifiable on every image of the sequence and, consequently, can be easily tracked from one image to another. It is further important to note that when intersections are used while maximum and minimum magnetization tag lines are worked with, a very dense mesh of tag lines and a dense set of intersections is obtained, enabling a very accurate determination of movements of tag lines.

In an example, for calculating a predicted position for privileged points, the acceleration of privileged points is considered to be constant. The discrete scheme is then, for example, a third order linear filter:

$$\hat{A}_{i,j}^n = 3A_{i,j}^{n-1} - 3A_{i,j}^{n-2} + A_{i,j}^{n-3}.$$

Predicted entities are represented with a ^ and, in this example, tag points from three preceding images are used as soon as these three images are available. From the set of points obtained, predicted tags can be constructed by employing an approximation among a spline function approximation or a rational approximation or any kind of interpolation.

In a preferred embodiment, the motion is constrained by estimating a function (f) that minimizes the distance between the predicted positions of privileged points and the result of the application of this function (f) to these privileged points and by applying the function (f) to tag equations of the preceding image of the sequence to construct the tags of the predicted image. For example, a similarity transformation consisting of a rotation, a translation and a scale change, expressed in the complex plane as:

$$f(z)=\lambda z+c, \lambda, c \in \forall$$

is used to constrain the motion. The module of $\lambda$ gives the scale factor, while its argument is the rotation angle. c is the translation vector. In this form, the optimization of $\lambda$ and c in the sense of the least squares criterion can be implemented by the pseudo-inverse method in $\mathcal{M}_n(\mathbb{C})$ using the privileged points. The predicted tags are then computed by applying the $f(\lambda,c)$ transformation to the former equation of tags of the preceding image. Once the predicted image has been constructed, it can be provided to a tag point detection step 15 (FIG. 1) in order to select tag points of a next image.

Figure 4A:
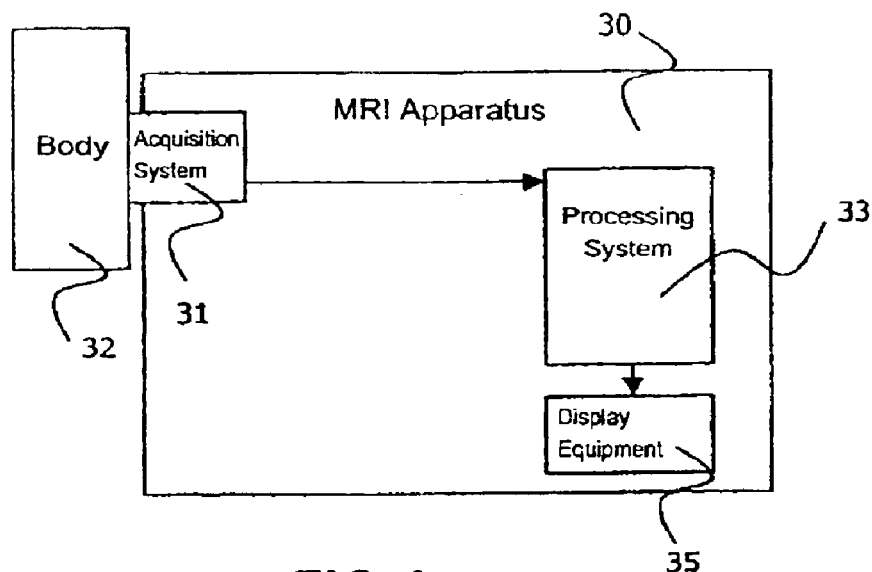
FIG. 4a and FIG. 4b are two examples of MRI apparatus for carrying out the method of the invention.
Figure 4B:
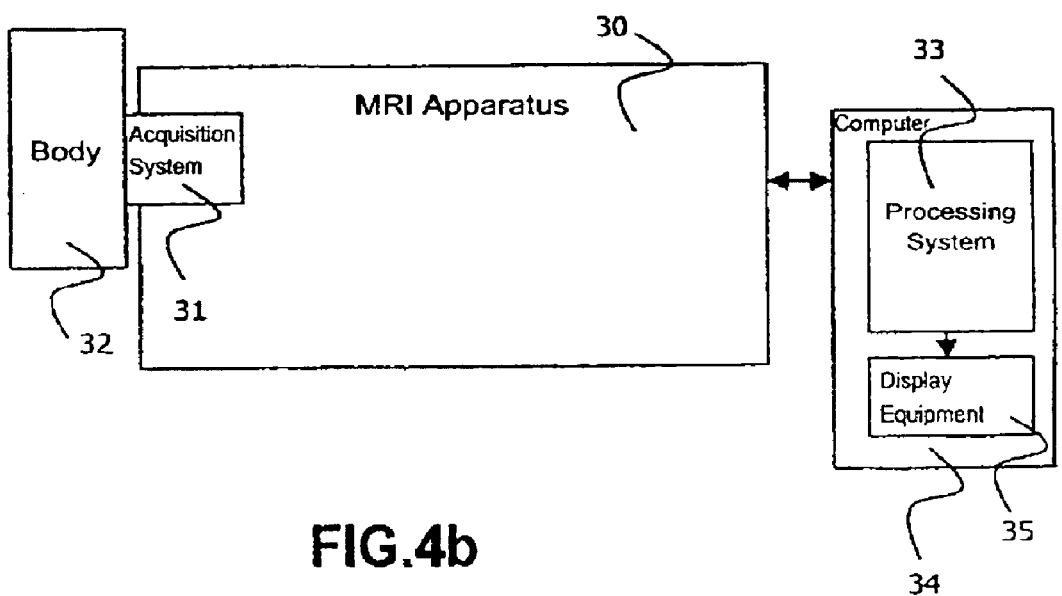

FIG. 4 illustrates the main features of an example of an MRI apparatus 30 to carry out the method as shown in FIG. 2. The MRI apparatus includes an acquiring system 31 to acquire data from a site of the body 32. Said data are applied to a processing system 33, generally included in the MRI apparatus 30 as illustrated in FIG. 4a. In a variant, this processing system 33 can be implemented in a computer 34, independent of the MRI apparatus 30, but connected to it, as illustrated in FIG. 4b. The processing system 33 executes a set of instructions according to a program. The program causes the processing system 33 to carry out the method of the invention on data provided by the acquiring system 31. Said processing system 33 is connected to a display equipment 35 to display processed data.

The drawings and their description hereinbefore illustrate rather than limit the invention, because there are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude that a function is carried out by an assembly of items of hardware or software, or both. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps.

What is claimed is:

1. An image processing method of detecting tag points in a current tagged image of a sequence of tagged images, comprising:

in the current image, estimating points which have optimal intensity values in intensity profiles and labeling said points as candidate points of a tag;

using a previously constructed predicted image constituted by predicted tags determined from tag equations of a preceding image of the sequence and from spatial and temporal parameters; and, in the current image, detecting tag points among said candidate points from said previously constructed predicted image;

determining tag equations for the current image from said detected tag points; and using said tag equations in the construction of a further predicted image for processing a next image of the sequence, wherein detecting tag points from said previously constructed predicted image comprises:

distinguishing two kinds of tags: negative tags corresponding to minimum magnetization and to maximum intensity in the intensity profile, and positive tags corresponding to maximum magnetization and to minimum intensity in the intensity profile;

distinguishing two kinds of candidate points: candidate points being optimum value points corresponding to maximum intensity in the intensity profile, and candidate points being optimum value points corresponding to minimum intensity;

selecting points of a negative tag D as being the candidate points corresponding to the maximum intensity, which are situated between the two predicted positive tags surrounding the predicted negative tag that corresponds to the negative tag D, and symmetrically selecting the points of a positive tag.

2. An image processing method as claimed in claim 1, wherein determining tag equations from detected tag points comprises using a rational least squares approximation to calculate the tag equations from the detected tag points, said rational least squares approximation being used alone or in combination with a further approximation to locally compensate for error between a sample and the rational least squares approximation.

3. An image processing method as claimed in claim 1, wherein the step of constructing a predicted image comprises:

choosing a given number of privileged points on tags of the preceding image of the sequence;

calculating, from positions of said privileged points on, at least the preceding image of the sequence, a predicted position of said privileged points; and constructing predicted tags of the predicted image from predicted positions of said privileged points.

4. An image processing method as claimed in claim 3, wherein the step of constructing predicted tags from predicted positions of said privileged points comprises:

estimating a function (f) that minimizes the distance between the predicted positions of privileged points and the result of the application of this function (f) to these privileged points; and applying said function (f) to tag equations of the preceding image of the sequence to construct the predicted tags of the predicted image.

5. An image processing method as claimed in claim 3, wherein privileged points are intersections between tags obtained from an MRI image tagged in a grid pattern in two different directions or between tags obtained from two MRI images each tagged in a straight and parallel line pattern in one direction different from the tagging direction of the other, said two MRI images corresponding to a similar step of the sequence, said intersections being calculated based on the tag equations.

6. An image processing method of claim 1, to be applied to a sequence of MRI tagged images, to track tags on successive images of the sequence, comprising steps of:

initializing the processing method by implementing the method of claim 1 for the first image of the sequence, using a first predicted image which represents a non-deformed modulation pattern; and iteratively implementing the image processing method of claim 1 for the following images of the sequence.

7. A computer readable medium storing a program comprising a set of instructions for carrying out the method as claimed in claim 1.

8. A system for processing images of a sequence of MRI tagged images, comprising:

means for detecting tag points of these images according to the method as claimed in claim 1; and means for displaying the results as a succession of images wherein tags are visible.

9. An MRI apparatus comprising:

means for acquiring sequences of MRI images from a site in a body; and processing means including the system as claimed in claim 8.

10. An image processing method of detecting tag points in a current tagged image of a sequence of tagged images, comprising:

in the current image, estimating points which have optimal intensity values in intensity profiles and labeling said points as candidate points of a tag;

using a previously constructed predicted image constituted by predicted tags determined from tag equations of a preceding image of the sequence and from spatial and temporal parameters; and, in the current image, detecting tag points among said candidate points from said previously constructed predicted image;

determining tag equations for the current image from said detected tag points; and using said tag equations in the construction of a further predicted image for processing a next image of the sequence, wherein constructing a predicted image comprises:
choosing a given number of privileged points on tags of the preceding image of the sequence;
calculating, from positions of said privileged points on, at least the preceding image of the sequence, a predicted position of said privileged points; and
constructing predicted tags of the predicted image from predicted positions of said privileged points, wherein the step of constructing predicted tags from predicted positions of said privileged points comprises:
estimating a function (f) that minimizes the distance between the predicted positions of privileged points and the result of the application of this function (f) to these privileged points; and
applying said function (f) to tag equations of the preceding image of the sequence to construct the predicted tags of the predicted image, and wherein the function (f) is a similarity expressed as $f(z)=lz+c$, where l and c are complex parameters.

* * * * *